United States Patent [19]

Palmer

[11] 4,317,614
[45] Mar. 2, 1982

[54] FIBER OPTIC BUS MANIFOLD

[75] Inventor: John P. Palmer, Pomona, Calif.

[73] Assignee: General Dynamics, Pomona Division, Pomona, Calif.

[21] Appl. No.: 123,037

[22] Filed: Feb. 20, 1980

[51] Int. Cl.³ .............................................. H04B 9/00
[52] U.S. Cl. .................................. 350/96.16; 250/227; 350/96.19; 455/612
[58] Field of Search ............... 350/96.15, 96.16, 96.17, 350/96.19, 96.20; 250/227; 370/1, 3, 4; 455/606, 607, 610, 612

[56] References Cited

U.S. PATENT DOCUMENTS

| | | | |
|---|---|---|---|
| 3,870,398 | 3/1975 | Love | 350/96.16 |
| 3,883,217 | 5/1975 | Love et al. | 350/96.16 |
| 3,891,804 | 6/1975 | Hachenburg | 370/79 |
| 3,953,727 | 4/1976 | d'Auria et al. | 370/3 |
| 3,986,020 | 10/1976 | Kogelnik | 370/3 |
| 4,017,149 | 4/1977 | Kao | 350/96.16 |
| 4,021,097 | 5/1977 | McMahon | 350/96.15 |
| 4,027,153 | 5/1977 | Käch | 350/96.16 X |
| 4,061,577 | 12/1977 | Bell | 370/3 |
| 4,072,399 | 2/1978 | Love | 350/96.16 |
| 4,074,127 | 2/1978 | Mochida et al. | 455/601 |
| 4,089,584 | 5/1978 | Polczynski | 350/96.16 |
| 4,135,780 | 1/1979 | Dyott | 350/96.15 |
| 4,136,929 | 1/1979 | Suzaki | 350/96.15 |
| 4,166,946 | 9/1979 | Chown et al. | 455/31 |

FOREIGN PATENT DOCUMENTS

| | | | |
|---|---|---|---|
| 52-24539 | 2/1977 | Japan | 350/96.15 |
| 54-118255 | 9/1979 | Japan | 350/96.15 |

Primary Examiner—John D. Lee
Attorney, Agent, or Firm—Henry M. Bissell; Edward B. Johnson

[57] ABSTRACT

A bus manifold utilizing master and slave terminals wherein a single data bus transmits master terminal signals to the slave terminals continuously and simultaneously with transmission from one of the slave terminals. The system uses a single-optical-fiber transmission line coupled to the master terminal for both transmit and receive functions. The slave terminals have sending units coupled to the transmission line and a pair of receivers tap-coupled to the transmission line. Sending by the slave terminals is in the opposite direction from sending by the master terminal, and the tap coupling is effective to tap signals travelling in both directions in the line.

13 Claims, 4 Drawing Figures

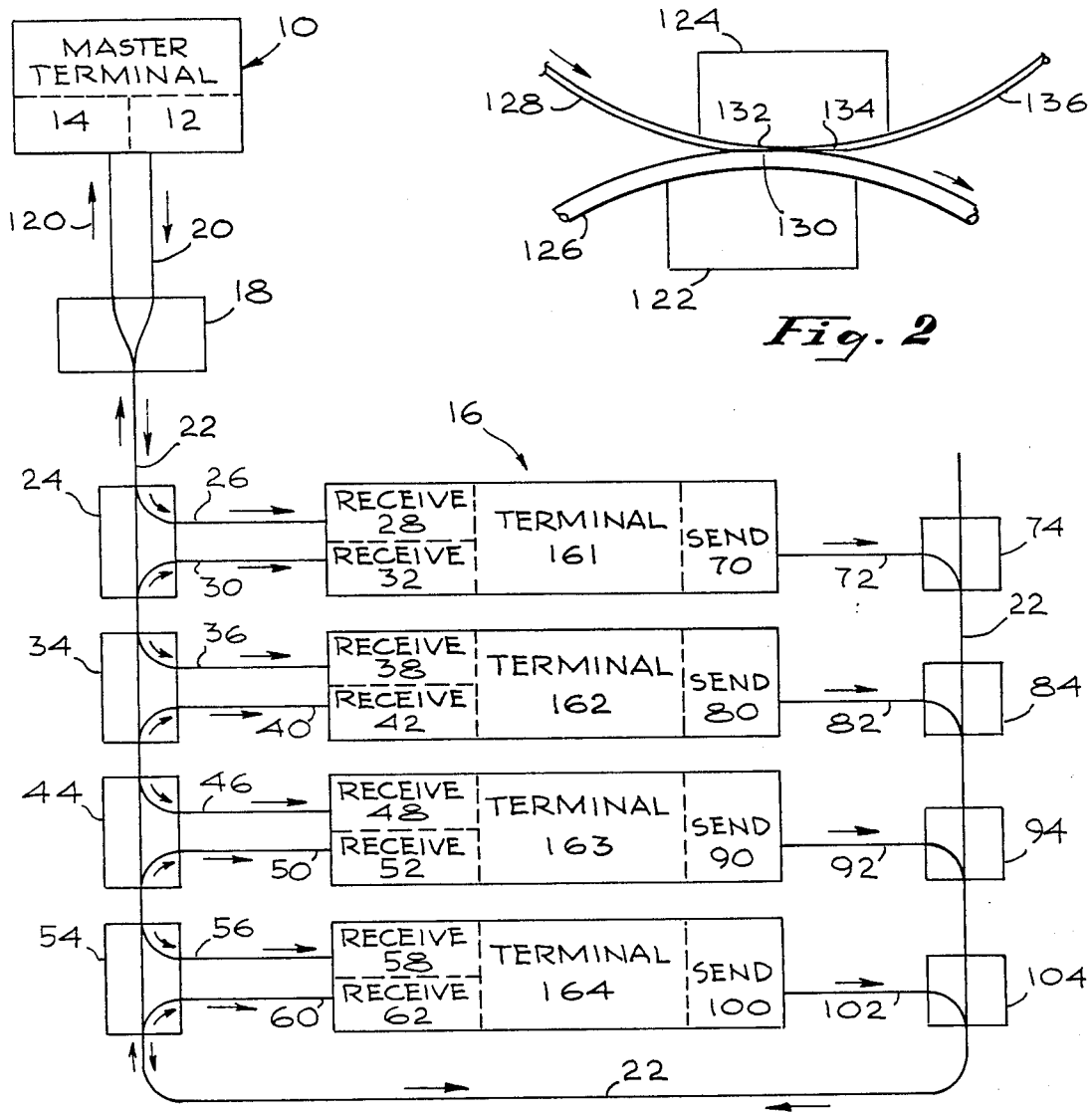
Fig. 2
Fig. 1
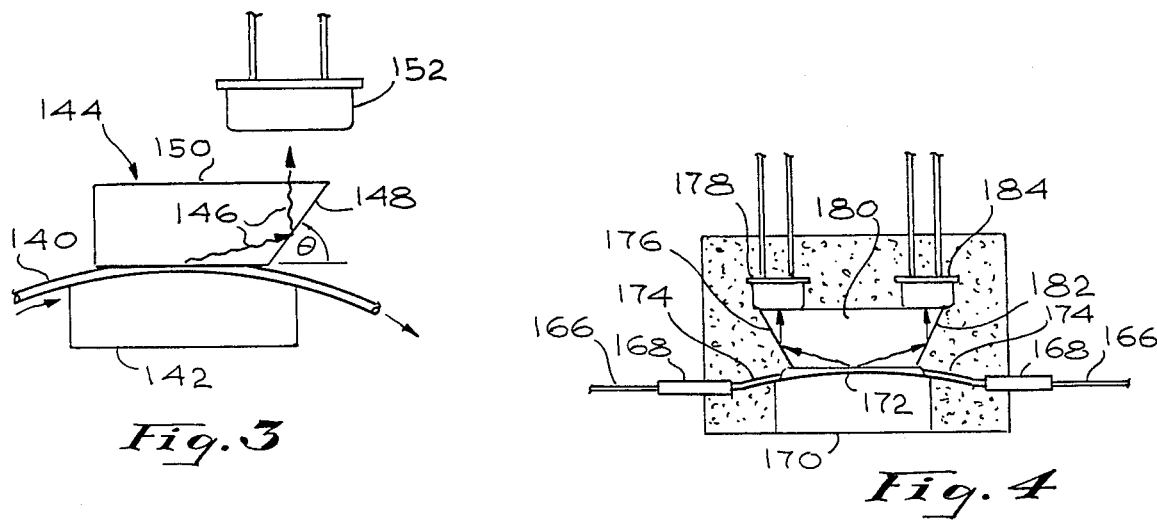
Fig. 3
Fig. 4

4,317,614

FIBER OPTIC BUS MANIFOLD

BACKGROUND OF THE INVENTION

1. Field of the Invention

The present invention relates to fiber optic transmission of signals through a manifold or data bus. More particularly, the present invention relates to the use of a single-optical-fiber transmission line coupled with a low-loss launch coupler to provide the data link for information transmission to and from the master terminal and with a series of slave terminals, each capable of receiving bidirectional signals carried in the transmission line and each capable of sending signals through the transmission line in a single direction.

2. Description of the Prior Art

Fiber optic devices, once a laboratory curiosity, are now receiving considerable attention and are used in industry. Fiber optic communication cables for telephone systems are not in limited service and conversion to "Lightwave Communications Systems" has been predicted for many telephone utilities.

Uses such as those noted above often require multiple connections for signal reception and use, since a large number of terminals are provided. The interconnection means is commonly described as a data bus. Data buses are used in the electronics industry to provide communication links between isolated terminals in applications such as computer systems, airplane and ship controls, electronic test equipment and weapons control systems. It has become generally known that wire transmission lines are of limited utility in many of the above uses due to such factors as limitations in bandwidth to the extent that the transmission line capability is substantially lower than the data production capability of the equipment. In addition, wire transmission lines are susceptible to electromagnetic interference from external sources and transmit only in a given direction at a given time. Thus the only means for utilizing wire transmission in a bidirectional manner is multiplexing of the signals that are transmitted. Fiber optics, on the other hand, has the potential capability of elimination of these problems, since fiber optic units are capable of transmission in a bidirectional mode and are immune to electromagnetic interference.

d'Auria et al in U.S. Pat. No. 3,953,727 suggests a system for single-optical-fiber transmission utilizing mirrors, photodetectors and diodes to generate signals for and receive signals carried in a fiber optic line.

Chown et al in U.S. Pat. No. 4,166,946 and Kogelnik in U.S. Pat. No. 3,986,020 both suggest optical fiber transmission systems. Chown et al uses a bundle of multiple fibers and utilizes couplings to connect the fibers to the terminals and remove portions of the signal from the main transmission line. Kogelnik, on the other hand, uses a strip guide or fiber and laser signals to pick off signals from plural stations and selectively transmit them to remote stations.

In another system, Suzaki in U.S. Pat. No. 4,136,929 utilizes a closed loop which receives its signal by tapping off a portion of the signal contained in an external transmission line. The closed loop utilizes the signal and returns the remaining signal to the transmission line at the point of take-off.

In U.S. Pat. No. 4,089,584 of Polczynski a manifold concept utilizing an arbitrary number of terminals is disclosed. The structure of the optical couplers and the means of fabrication are not provided. Only one terminal transmits to the other terminals at a given time and the signal flow is unidirectional. A bus using such a manifold is half duplex and the data is time-division-multiplexed.

SUMMARY OF THE INVENTION

In the present invention a fiber optic manifold for a data bus is provided with input and outputs ports for an arbitrary number of terminals. The manifold is capable of full-duplex transmission of optical signals between one terminal (master terminal) and the remaining terminals (slave terminals). The slave terminals communicate with each other and with the master terminal, one at a time. That is, only one slave terminal is permitted to transmit at a given time while the master terminal is permitted to transmit continuously and all the slave terminals can receive signals continuously from the master terminal and from a transmitting slave terminal. This full communication capability is provided in the present system by utilizing the bidirectional characteristics of a single-optical-fiber data bus. The signals generated by and transmitted from the master terminal travel in a first direction through the data bus, and can be utilized by all of the slave terminals. The signals generated by one of the slave terminals, on the other hand, are transmitted in the opposite direction through the single-fiber bus and thus are made available to all of the slave terminals and the master terminal independent of the signals being generated by the master terminal.

The master terminal is provided with a single receiving port and a single transmitting port. Each of the slave terminals is provided with two receiving ports and a single transmitting port. All of the ports are connected by a single-fiber data transmission bus or "highway" using appropriate optical fiber couplers. At the master terminal, the send and receive ports are connected together by a directional coupler which efficiently couples almost all of the transmitted signal into the optical fiber bus without significant loss and without significant reflection to the receive side of the coupler. In addition, the signals transmitted to the master terminal from the slave terminals, as provided to the coupler, are effectively transmitted to the receive side of the master terminal without significant loss to the transmission fiber. Travelling along the "highway", the fiber is next connected to each of the slave terminals by a bidirectional tap coupler, or by a pair of unidirectional tap couplers coupled to tap portions of the signals travelling in opposite directions in the highway. Each slave terminal is provided with reception circuitry to separately utilize signals travelling in each direction, i.e. from the master terminal and from other slave terminals. The tap couplers cannot connect the slave terminals in series.

Travelling further along the highway, after connecting all of the bidirectional receive ports, the single-fiber bus is serially connected to the transmission ports of the slave terminals. This connection is made by use of the same type of directional coupler utilized in the main terminal. That is, the signal generated in the slave terminal is coupled to the main bus through a coupler which does not exhibit significant signal coupling loss and is directional in nature. The transmission terminals are preferably connected to the main bus in reverse serial order, as compared to the serial order of the connection of the reception terminals. That is, the last slave terminal to be tap coupled to the bus is the first to be launch coupled to the bus. In this manner, the number of slave terminals may vary and each slave terminal will communicate with all other slave terminals and the master terminal. The number of slave terminals, of course, would be limited by the ability of the system to generate a sufficiently strong signal to travel through the highway, and by the length of the remaining unused, uncoupled lines. Repeater or amplifier circuitry could be provided at any point in the bus line to increase the capacity of the line to transmit over long distances.

The transmitting couplers for the slave terminals and the transmit and receive coupler for the master terminal are described in applicant's concurrently filed application Ser. No. 123,034 entitled OPTICAL FIBER LAUNCH COUPLER. Basically, the coupler is directional in nature and is made up of a first glass-clad-glass fiber which is formed on an arcuate surface and adhered thereto prior to lapping of the external side thereof. The lapping is conducted through the glass cladding to expose a small flat surface which is utilized to couple the light from a second fiber used in producing the coupler. The second fiber is of significantly smaller diameter, as defined in the above-identified application. It is also formed on an arcuate surface and lapped. However, in this case the lapping is allowed to continue until such time as the central core of the glass-clad-glass fiber is severed. The result is the formation of two, flat, elliptical surfaces on the smaller fiber. The size of one of these flat elliptical surfaces is used as a guide for the lapping of the larger fiber so that the two surfaces can be placed in a mating relationship and sealed together. The mating is effected to maximize the amount of signal transmitted to the larger fiber from the joined portion of the severed fiber. Also, the amount of signal transmitted through the larger fiber, independent of the smaller fiber, is maximized.

The resulting coupler has only three effective ports. That is, the larger fiber is bidirectional in nature in that it can transmit light in both directions without significant loss of signal to the smaller severed fiber. Signals carried in the joined portion of the severed fiber are substantially, if not completely, coupled into the larger fiber at the point of mating. However, the signals carried in either of these are not transmitted to the other severed fiber portion ("fourth fiber") since it is not coupled to any other fiber portion.

The bidirectional tap couplers for the slave terminals are described in further detail in concurrently filed application Ser. No. 123,038 of John P. Palmer and Phillip B. Ward, Jr. entitled DUAL DIRECTIONAL TAP COUPLER, assigned to the assignee of this application. These tap couplers are prepared by utilizing the single glass-clad-glass fiber and forming it over an arcuate surface. The fiber is then lapped to a predetermined depth, depending upon the radius of curvature to the arcuate form and the diameter of the fiber core. The depth of the lapping determines the size of the core section exposed during lapping. This core section is specifically selected so that bidirectional signals carried in the core of the fiber are partially coupled to separate faces on a prism which is mated to the flat, lapped surface. The faces of the prism are reflective and each reflects one of the light signals transmitted to the prism outwardly to a photodiode.

The geometry of this system is described in detail in the above-identified application. Basically, the arc is selected to remove the appropriate amount of signal and depends on the diameter of the fiber. The lapping is selected in accordance with the amount of fiber available and the percentage of signal to be tapped. An angle of 52°±5° is used on the reflective prismatic surface to reflect a narrow, highly collimated signal out of the prism in a direction substantially perpendicular to the upper surface of the prism. In this manner minimal reflection back to the prism occurs at the exit point. Photodiodes or other appropriate light-sensitive elements are utilized and positioned at each of the light exiting locations in order to sense the tapped signal and convey it to the slave terminal. The use of this dual directional tap coupler allows for the tapping of portions of the master terminal transmitted signal as well as portions of slave terminal transmitted signals, which travel in opposite directions in the single-fiber transmission line.

BRIEF DESCRIPTION OF THE DRAWINGS

A better understanding of the present invention may be had from a consideration of the following detailed description, taken in conjunction with the accompanying drawings in which:

FIG. 1 is a schematic of the data bus system of the present invention;

FIG. 2 is a schematic of the coupler used for the master terminal and for the sending sections of the slave terminal;

FIG. 3 is a schematic of a unidirectional tap coupler which may be used for the slave terminals; and FIG. 4 is a schematic of the preferred bidirectional tap coupler used with each slave terminal.

DESCRIPTION OF THE PREFERRED EMBODIMENTS

The present invention will be defined in terms of a master terminal and four slave terminals used in the open loop system disclosed in FIG. 1. However, a larger or smaller number of slave terminals may be used in the system, and the distance between the slave terminals may vary. For instance, slave terminals which are located in different buildings may be interconnected. In addition, repeating terminals to increase signal strength may be utilized where the distance between the master terminal and the most remote slave terminal is sufficient to justify their use. This depends on the number of terminals as well as the strength of the signals generated at the master terminal and at the slave terminals. The only communication limitation without multiplexing is that only one slave terminal can transmit at a given time.

In FIG. 1, master terminal 10 is provided with a transmitter 12 and a receiver 14. The transmitter receives an internal electrical signal from the master terminal, which may, for example, be generated by a computer, and amplifies and converts it into a light signal by use of a light emitting diode, laser, or other optical signal generating unit. The particular light source depends upon the design characteristics of the unit. Characteristics such as the number of slave terminals, the characteristics of the signal generated by the master terminal and the travel distance for the signal are design considerations. The signal transmitted conveys the data to the slave terminals, indicated generally as 16, and may be amplitude or frequency modulated to carry the data. Also, a selected frequency may be used to act as a carrier for the signals. Additionally, each slave terminal may be assigned a specific frequency so that the master terminal will communicate with a given slave terminal only when the master terminal utilizes the correct frequency. This is done by generating a different selected frequency carrier signal at the master terminal for each slave terminal and providing a bandpass filter for the slave terminal, so that only one frequency signal is used by the slave terminal.

This signal generated at transmitter 12 enters coupler 18 through optical fiber 20. Coupler 18 is the type shown in FIG. 2. Main transmission fiber 22, exiting from coupler 18, is joined to first dual directional tap coupler 24. The signal carried from transmitter 12 is partially tapped off of main fiber 22 onto line 26 which is directly connected to first slave terminal 161 through receiver 28. The remaining signal is then transmitted to bidirectional tap coupler 34; a portion is tapped off to line 36 for supplying receiver 38 and slave terminal 162. The main signal then enters tap coupler 44 where a portion is provided to line 46 which communicates with receiver 48 of terminal 163. Finally, the signal is transmitted to tap coupler 54 which communicates with line 56 and receiver 58 in slave terminal 164. At this point, depending on the strength of the signal provided to main transmission fiber 22, the main signal may be sufficiently low-powered that it is no longer useful. This signal residue, however, travels along the remaining path of main fiber 22 but is of no further use in the illustrated embodiment. If more terminals were placed downstream of slave terminal 164, a stronger signal or the remaining signal, if any, would be utilized.

Slave terminals 161–164 utilize the signals provided to receivers 28, 38, 48 and 58 through conventional means. By virtue of the use of the photodiode at the tap coupler, as illustrated in FIGS. 3 and 4, the light signal is converted into an electronic signal which is carried to the receiver by lines 26, 36, 46 and 56. The signal is amplified by the receiver and transmitted to the remaining circuitry in the slave terminal, which can be a computer terminal, for example.

Each of terminals 161–164 is provided with a light-emitting diode and coupler. The structure is as described for transmission unit 12 and coupler 18 in the master terminal. Sending unit 70 for terminal 161 generates a signal which is converted to an optical signal for fiber 72 which is coupled into main line 22 by directional coupler 74. Coupler 74 is generally the same as coupler 18, and will be described with reference to FIG. 2. In a like manner, slave terminal 162 is provided with sending unit 80 which generates a signal for fiber 82 and coupler 84. Slave terminal 163 is provided with sending unit 90 which generates a signal for fiber 92 and coupler 94. Lastly, terminal 164 is provided with sending unit 100, fiber 102 and coupler 104. Couplers 74, 84, 94 and 104 are serially connected in the reverse order when compared with the receiving units so that signals generated from the master terminal reach slave terminal 161 first, and signals generated by the slave terminal 161 are the most remotely coupled to main lines 22. The signals generated and transmitted by slave units 16 flow in the opposite direction to main fiber 22, and thus a signal generated by any one of slave terminals 161–164 is available to all of the slave terminals through bidirectional tap couplers, 24, 34, 44 and 54. The tapping of these signals travelling back toward master terminal 10 is effected through lines 30, 40, 50 and 60 which tap off signals from couplers 24, 34, 44 and 54, respectively. These signals are utilized in slave terminals 161–164, respectively, through receivers 32, 42, 52 and 62. Again, the structure described above with regard to tapping the main signal is provided within couplers 24, 34, 44 and 54, which communicate with slave terminals 161–164, in order to convert the light signal to an amplified usable electronic signal. Exemplary of the appropriate signals are those capable of use in an emitter-coupled logic (ECL) or transistor-transistor logic (TTL) unit.

The signal generated by any one of slave sending units 70, 80, 90 and 100, after tapping by couplers 54, 44, 34 and 24, is transmitted to coupler 18 where it enters master terminal 10 through line 120 and is converted to a usable electronic signal by receiver 14.

In this manner, the master terminal has a single receive port and a single send port, and each slave terminal has two receive ports and a single send port. All of the transmission and receive ports are connected through a single-fiber transmission highway using fiber optic couplers. The electro-optical transmitters and detectors provide the necessary interface between the electronic terminals and the fiber optic manifold. The data transmission by the master terminal is received by one of the two receiving ports for each slave terminal; and the data transmitted by any slave terminal is received by all of the other slave terminals through each slave terminal's second receive port, as well as being returned to the master terminal. Because of the properties of the single-optical-fiber transmission line, the signals propagating in opposite directions in the highway do not interfere with each other and the directional couplers steer the signals unidirectionally so that only minor and insignificant mixing of the signals occurs at the various transmission and reception points. Consequently, the master terminals is permitted to transmit continuously, while the slave terminals are preferably time-division-multiplexed with respect to each other only. The master terminal can continuously direct the transmission of data between the slave terminals over a common line, without interruption and without the use of additional couplers at the slave terminals. This provides a significant reduction in the electronic hardware for the master terminal since it is not necessary to time-division-multiplex the master terminal. In addition, a significant reduction in control software and transmission line hardware and an increase in the rate of transfer of data are effected by this system.

The present system is made possible through the use of the couplers described in FIGS. 2–4. In FIG. 2, the directional signal launching coupler used at the sending unit for each of the slave terminals and for the sending and receiving functions at the master terminal is shown. This coupler is described in more detail in applicant's concurrently filed application Ser. No. 123,034 entitled FIBER OPTIC LAUNCH COUPLER. In general, the coupler is produced by forming two arcuate surface forms 122 and 124 and adhering optical fibers 126 and 128 thereto by an epoxy resin, for instance. Both of fibers 126 and 128 are surface lapped to produce flat elliptical surfaces 130, 132 and 134. Flat elliptical surfaces 130 and 132 are joined in the final coupler so that light generated in fiber 128 is coupled directly into fiber 126, through elliptical surface 132. Elliptical surface 134, on the other hand, is not coupled and as a result fiber section 136 is not functional. Both fibers are glass-clad-glass fibers and the core of fiber 128 is completely lapped through so that it is severed and produces the two elliptical surfaces. However, the core of fiber 126 is not severed and only a small portion of it is removed in order to cause the coupler of the present invention to function properly. The removal of only a small portion of the fiber is made possible by the utilization of fiber 126 which has a larger core diameter than severed fiber 128. Fiber 126 forms part of the single-fiber main transmission line 22 in FIG. 1 and is connected to or forms input line 120 at the master terminal. In this manner, signals propagated from master terminal transmitter 12 would enter fiber 20 which would be connected to or form input fiber 128 and be coupled to main fiber 126 which would be connected to main transmission fiber 22.

The directional characteristics of the coupler shown in FIG. 2 are such that only a small portion of the signal traversing line 128 is lost, and a very small portion of it is transmitted backward through line 126. Over 95% of the signal is coupled into fiber 126, and travels outward in the direction shown by the arrow in the drawing. On the other hand, signals travelling in either direction in fiber 126 are approximately 95% retained in the fiber and transmitted downstream for further use.

In FIG. 3, an optional unidirectional tap coupler is shown. This tap coupler is described in detail in concurrently filed application Ser. No. 123,038 entitled DUAL DIRECTIONAL TAP COUPLER. Details of the fabrication of such a device are set forth in application Ser. No. 15,027, filed Feb. 26, 1979 and assigned to the assignee of this application. Basically, fiber 140 is adhered to an arcuate surface on form 142 as described with regard to fiber 126 in FIG. 2 and partially lapped. The lapping is sufficient to provide tapping of a portion of an optical signal to prism 144. The curvature utilized for the tap coupler shown in FIG. 3 is selected to result in tapping of the desired percentage of the signal carried through fiber 140. This signal is transmitted as shown by arrows 146 to prismatic reflective surface 148 and reflected in a direction substantially normal to top surface 150 of prism 144. Photodiode 152 is positioned on or adjacent top surface 150 of the prism at a point where the maximum signal is obtained. The geometry of this arrangement and specific manufacturing procedures are described in further detail in the above-mentioned concurrently filed application. It has been found that an angle $\theta$ for reflective surface 148 of $52° \pm 5°$ is preferred. This results in a very narrow collimated light signal being emitted from prism 144 and impinging upon photodiode 152 so that maximum signal transmission with minimum loss can be obtained. Two of these couplers would be utilized for the receiving functions of each slave terminal. The couplers are connected in opposite directions so that signals carried in main fiber 22 of FIG. 1 would be tapped in both directions for use by the slave terminal.

In the alternative, the bidirectional coupler shown in FIG. 4 may be utilized to replace the two, single-direction tap couplers. This dual direction tap coupler is also described in more detail in the above-mentioned concurrently filed application. Generally, signals travelling through fiber 166 in either direction are coupled to fiber 174 through standard optical couplers 168. Form 170 is used to produce the arcuate section 172 of the internal fiber 174. The geometry of this unit is substantially similar to that of the unit described above in that signals travelling from right to left in the line are partially tapped out of line 174 at surface 172, impinge reflective prismatic surface 176 and are reflected to photodiode 178 in a narrow collimated beam. Prism 180 is provided with second reflective prismatic surface 182 which receives the tapped portion of the signal travelling from left to right in fiber 174 and reflects it to second photodiode 184.

The unit is manufactured by forming fiber 174 over form 170, and adhering it to the form with, preferably, an optically transparent epoxy resin. The arcuate surface of the fiber is then lapped a predetermined amount to produce a flat section in the core of the glass-clad-glass fiber. Due to the curvature of the arc, a portion of the signal carried in the fiber is released from the fiber through the lapped surface. The double prismatic faced prism 180 is then placed on and adhered to this small, flat, lapped surface on fiber 174 and the tap signal is thus reflected by one of the mirrors, depending upon its direction of travel in fiber 174. The prism is positioned on, mated and adhered to the fiber by an epoxy resin and allowed to set. After setting of the resin, a light signal generated, for instance, by a laser, is passed in one direction through the fiber and the position of the first photodiode adjusted for the generation of maximum current. The first photodiode is then adhered in position. The laser is then used to generate a signal flowing in the opposite direction and the second photodiode positioned by maximizing its output signal. After adhering the second photodiode to the prism, the whole unit is sealed together with, for example, a potting compound and the appropriate electrical and fiber connectors. These bidirectional tap couplers may be used as terminals 24, 34, 44 and 54 on the receptor side of the slave terminals in FIG. 1.

There are significant logical extensions to the application of the present invention. For example, the data transmitted by the master terminal can be transmitted at different optical wavelengths from the data transmitted by the slave terminals. Using these different optical wavelength senders and coupling them with spectral filters at the receiving ports would allow the rejection of undesirable reflections from the couplers and significantly enhance the discrimination of the signals at the receivers. For example, the master terminal could use a light-emitting diode which transmits at a center wavelength of 820 nm, such as an RCA C-30133 LED, and each of the slave terminals could be equipped to transmit at, for example, 1060 nm with an RCA C-30116 LED. The appropriate narrow bandpass filters would then be provided at the reception ports for both master and slave terminals, in order to discriminate between the signals generated by the master terminal and signals generated by each of the slave terminals.

Another way of enhancing the directional signal discrimination in the present invention is to transmit signals on a sub-carrier at radio or audio frequencies. For example, data may be sent by the master terminal through modulation of a 4 MHz sine wave, and the data transmitted by the slave terminals could be carried by modulation of a 40 MHz sine wave. By utilization of the appropriate frequency-sensitive circuitry in the slave and master terminal receiver sections, substantial discrimination of the signals transmitted to the receivers can be effected.

Although there have been described above specific arrangements of a fiber optic bus manifold system in accordance with the present invention for the purpose of illustrating the manner in which the invention may be used to advantage, it will be appreciated that the invention is not limited thereto. For example, although the invention has been disclosed in the context of association with certain signal generating systems, the principles of the invention are equally applicable to other signal generating and modulating systems and the like. Accordingly, any and all modifications, variations or equivalent arrangements which may occur to those skilled in the art should be considered to be within the scope of the invention as defined in the appended claims.

What is claimed is:

1. A fiber optic data transmission system comprising:
    a master terminal having directional signal transmission means and signal reception means, said master terminal being capable of transmitting and receiving simultaneously and continuously;
    a single-optical-fiber transmission line coupled to receive signals from said transmission means and direct signals to said reception means; and
    at least one slave terminal including directional signal transmission means and signal reception means coupled to said line by separate coupling means, each said slave terminal being incapable of transmitting continuously or simultaneously with transmissions from another slave terminal, said master and slave terminal directional signal transmission means being coupled to said transmission line for signal transmission in opposite directions, relative to each other, and said coupling of the slave terminal signal reception means to said line being effective to couple signals from both of said directional signal transmission means simultaneously to said slave terminal.

2. The system of claim 1 wherein there are a plurality of slave terminals, the slave reception means of the plural terminals are serially connected to the transmission line in a first order and the directional signal transmission means of the plural terminals are serially connected to the transmission line for signal transmission in the reverse of said first order.

3. The system of claim 1 wherein the signals coupled to the slave terminals from the transmission line are produced by an electrical signal generating, light-sensitive element.

4. The system of claim 3 wherein the coupling of the slave terminal signal reception means to the transmission line further comprises:
    a single-optical-fiber having an arcuate surface with a radius of curvature from 6 to 8 mm;
    a planar surface formed on the core of said fiber along said arcuate section effective to tap a portion only. of signals travelling in either direction in said fiber;
    prism means positioned next adjacent said planar surface and effective to receive signals tapped out of said fiber; and
    said light-sensitive element being effective to receive tapped signals from said prism, produce an electrical signal responsive to the tapped signal, and convey the electrical signal to the reception means of said slave terminal.

5. The system of claim 4 wherein said prism means further includes light-reflective means at an angle of 52°±5° from said planar surface, effective to reflect tapped signals and direct such signals to said light-sensitive element.

6. The system of claim 5 wherein said prism means further includes two reflective means, the first effective to transmit tapped signals carried in a first direction in said fiber to a first light-sensitive element and the second reflective means effective to transmit tapped signals carried in said fiber in the opposite direction to a second light-sensitive element.

7. The system of claim 6 wherein each light-sensitive element further includes a photodiode.

8. The system of claim 7 wherein each light-sensitive element further includes an amplifier.

9. A fiber optic data transmission system comprising:
    a master terminal having directional signal transmission means and signal reception means;
    a single-optical-fiber transmission line coupled to said transmission means and said reception means; and
    at least one slave terminal including directional signal transmission means coupled to said line and signal reception means coupled to said line, said master and slave terminal directional signal transmission means being coupled to said transmission line for signal transmission in opposite directions, relative to each other, and said coupling of the slave terminal signal reception means to said line being effective to couple signals from both of said directional signal transmission means to said slave terminal;
    wherein the master terminal directional signal transmission means and signal reception means are coupled to the transmission line by a three-port optical coupler;
    the optical coupler having a first input port formed of a first single-optical-fiber which is coupled to the master terminal directional signal transmission means; and
    the second and third ports being formed of a second single-optical-fiber, the second port being connected to said transmission line, the third port being connected to said master terminal signal reception means, and the first fiber being of a diameter smaller than the second fiber and terminating at a juncture with the second fiber.

10. The system of claim 9 wherein the first fiber has a planar elliptical terminus mated to a planar elliptical face formed on the second fiber.

11. The system of claim 10 wherein the fibers are glass-clad-glass.

12. A fiber optic data transmission system comprising:
    a master terminal having directional signal transmission means and signal reception means;
    a single-optical-fiber transmission line coupled to said transmission means and said reception means; and
    at least one slave terminal including directional signal transmission means coupled to said line and signal reception means coupled to said line, said master and slave terminal directional signal transmission means being coupled to said transmission line for signal transmission in opposite directions, relative to each other, and said coupling of the slave terminal signal reception means to said line being effective to couple signals from both of said directional signal transmission means to said slave terminal;
    wherein the slave terminal directional signal transmission means is coupled to the transmission line through a fiber optic coupler comprising:
    a first smaller-diameter single-optical-fiber having an elliptical planar core terminus; and
    a second larger-diameter single-optical-fiber connected to the transmission line and having an elliptical planar exposed core surface of substantially the same area as the terminus of the smaller fiber, said terminus and said elliptical surface being mated together and effective to produce data transmission to said transmission line from said slave terminal.

13. The system of claim 12 wherein the fibers are glass-clad-glass.

* * * * *